United States Patent
Chao (10) Patent No.: US 8,451,733 B2
(45) Date of Patent: May 28, 2013

(54) METHODS OF OPTIMIZING SCANNING PARAMETERS FOR A PLURALITY OF CHANNELS IN A WIRELESS BAND

(75) Inventor: Kuang-Cheng Chao, New Taipei (TW)

(73) Assignee: AmTRAN Technology Co., Ltd, Jhonghe District, New Taipei (TW)

(*) Notice: Subject to any disclaimer, the term of this patent is extended or adjusted under 35 U.S.C. 154(b) by 190 days.

(21) Appl. No.: 13/204,715

(22) Filed: Aug. 8, 2011

(65) Prior Publication Data

US 2013/0039181 A1 Feb. 14, 2013

(51) Int. Cl.
*G01R 31/08* (2006.01)

(52) U.S. Cl.
USPC ............ 370/235; 370/328; 370/338; 455/434

(58) Field of Classification Search
USPC ............................. 370/235, 328, 338; 455/434
See application file for complete search history.

(56) References Cited

U.S. PATENT DOCUMENTS

| | | | |
|---|---|---|---|
| 2008/0014934 A1* | 1/2008 | Balasubramanian et al. | 455/434 |
| 2008/0075035 A1* | 3/2008 | Eichenberger | 370/328 |
| 2010/0267380 A2* | 10/2010 | Montemurro et al. | 455/434 |

OTHER PUBLICATIONS

IEEE—An efficient AP channel scanning scheme for real-time streaming over WLAN by Lee, Hyun Chul.*

* cited by examiner

Primary Examiner — Hassan Kizou
Assistant Examiner — Hashim Bhatti
(74) *Attorney, Agent, or Firm* — Winston Hsu; Scott Margo (57) ABSTRACT

A method of optimizing scanning parameters for a plurality of channels in a wireless band includes identifying channels in the plurality of channels as overlapping channels and identifying channels in the plurality of channels as non-overlapping channels, wherein each of the non-overlapping channels transmits and receives signals at frequencies that do not overlap frequencies of other non-overlapping channels. Then scanning parameters for each channel are optimized in order to assign the scanning parameters to be normal scanning parameters or extended scanning parameters, the extended scanning parameters indicating longer scanning times used for scanning channels than that of the normal scanning parameters. Next each overlapping channel is scanned with a networked electronic device using the normal scanning parameters. The method also includes scanning each non-overlapping channel with the networked electronic device using the extended scanning parameters.

19 Claims, 7 Drawing Sheets

| Scanning time | Normal scanning (ms) | | Extended scanning (ms) | |
|---|---|---|---|---|
| | Active | Passive | Active | Passive |
| Minimum | 60 | 80 | 120 | 200 |
| Maximum | 80 | 110 | 200 | 300 |

| Band | Freq. Range | Bandwidth |
|---|---|---|
| ISM-2400 | 2400-2483.5MHz | 83.5MHz |
| U-NII Lower | 5150-5250MHz | 100MHz |
| U-NII Middle | 5250-5350MHz | 100MHz |
| U-NII Worldwide | 5470-5725MHz | 255MHz |
| U-NII Upper | 5725-5825MHz | 100MHz |

| Scanning time | Normal scanning (ms) | | Extended scanning (ms) | |
| --- | --- | --- | --- | --- |
| | Active | Passive | Active | Passive |
| Minimum | 60 | 80 | 120 | 200 |
| Maximum | 80 | 110 | 200 | 300 |

METHODS OF OPTIMIZING SCANNING PARAMETERS FOR A PLURALITY OF CHANNELS IN A WIRELESS BAND

BACKGROUND OF THE INVENTION

1. Field of the Invention

The invention relates to scanning channels in wireless networks, and more particularly, to a method for adjusting scanning parameters used for scanning channels in a predetermined wireless band in order to optimize the scanning parameters according to congestion levels of the channels.

2. Description of the Prior Art

Wireless local area networks (WLANs) typically transmit via radio or infrared frequencies to connect data devices. WLANs link portable and wireless computer devices, also called mobile stations or terminals, to a wired LAN via a plurality of fixed access points (APs), also called base stations. Allowing WLAN devices to communicate with the infrastructure network, access points provide for wireless communications within respective cells and are typically spaced throughout a designated networked area. The access points facilitate communications between a networked set of 802.11-compliant devices called a basic service set (BSS), as well as communications with other BSSs and wired devices in or connected to wired infrastructure network systems.

Figure 1:
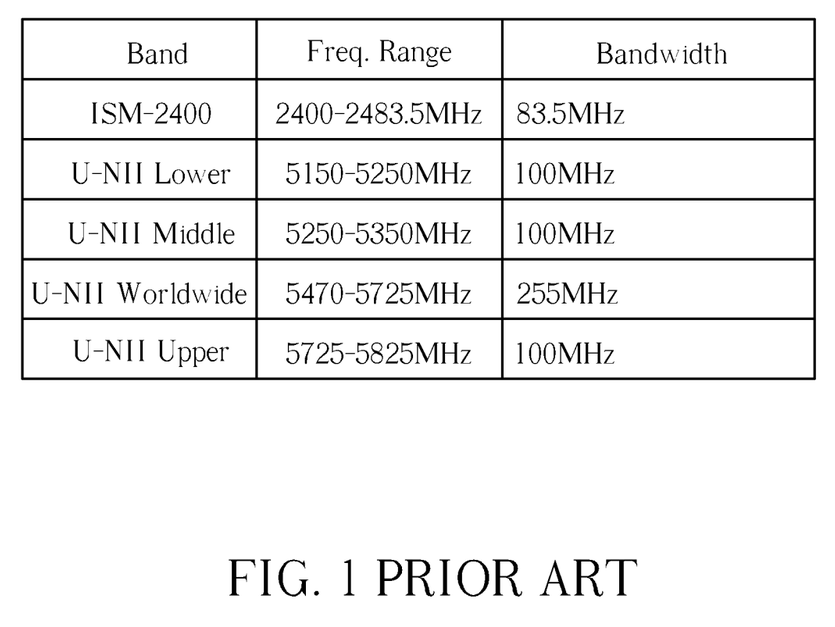
FIG. 1 is a chart showing various wireless bands defined as industrial, scientific and medical (ISM) radio bands as well as wireless bands defined as Unlicensed National Information Infrastructure (U-NII) radio bands.

The most common WLAN technologies are described in the Institute of Electrical and Electronics Engineer's IEEE 802.11 family of industry specifications, which include two physical-layer standards: 802.11b operating at 2.4 GHz and delivering up to 11 Mbps at 250 feet maximum; and 802.11a operating at 5 GHz and delivering up to 54 Mbps at 150 feet maximum. A third standard, 802.11g, provides the speeds of 802.11a at the distances of 802.11b. Other wireless standards are also used that use other wireless bands, each operating at a specific frequency range and corresponding bandwidth, as shown in FIG. 1. FIG. 1 depicts a chart showing various wireless bands defined as industrial, scientific and medical (ISM) radio bands as well as wireless bands defined as Unlicensed National Information Infrastructure (U-NII) radio bands. The chart shown in FIG. 1 is not an exhaustive list of radio bands, and is only used as an example. These ISM and U-NII bands are unlicensed frequency bands used in the 802.11b, 802.11a, 802.11g, and 802.11n specifications. For each band, there are some non-overlapped channels used in the same area with no interference between them, as will be explained below.

Before a WLAN device can communicate with other devices in a given WLAN, it must first locate access points. The IEEE 802.11 medium access control (MAC) protocol defines beacon frames sent at regular intervals, known as beacon intervals, for example, every 100 microseconds, by an access point that allow WLAN devices to monitor for the presence of an access point. Passive and active scanning techniques have been developed for WLAN devices to detect access points, although the 802.11 standard does not mandate particular methods for scanning.

Passive scanning allows the network interface card (NIC) of a WLAN device to find an IEEE 802.11 network by listening for traffic. As defined in 802.11, passive scanning involves a WLAN device listening to each frequency channel for no longer than a maximum duration. In this passive mode, the wireless NIC listens for beacons from neighboring access points, while extracting information about the particular channel. Passive scanning expends time and battery power while listening for a beacon frame that may never occur or may be on an idle channel.

The scanning time used for passive scanning is configured during the initialization stage of the WLAN device driver. To initiate a passive scan, the driver commands the firmware to perform a passive scan with a list of channels. The firmware sequences through the list of channels and sends any received frames to the driver. The driver is able to abort the passive scan when the desired beacon or probe response is received.

Active scanning, in contrast to passive scanning, requires the scanning wireless NIC to transmit requests and receive responses from other 802.11 wireless NICs and access points. Active scanning allows the mobile wireless NIC to interact with another wireless NIC or access point based on probe requests and probe responses.

The active scanning of the IEEE 802.11 MAC uses a set of management frames including probe request frames that are sent by a WLAN device and are followed by probe response frames sent by an available access point. In this way, a WLAN device may scan actively to locate an access point operating on a certain channel frequency and the access point can indicate to the WLAN device what parameter settings it is using.

In an active scan, the WLAN device transmits a probe request frame, and if there is a network on the same channel that matches the service set identity (SSID) in the probe request frame, an access point in that network will respond by sending a probe response frame to the WLAN device. The probe response includes information the WLAN device uses to access a description of the network. The WLAN device processes the beacon frames and any additional probe responses that it may receive.

Once the various responses are processed or it has been determined that no response has been received within a prescribed time, a WLAN device may continue to scan on another radio channel. At the end of the scanning process, the WLAN device has accumulated data about the networks in its vicinity, and the device can determine which network to join.

Figure 2:
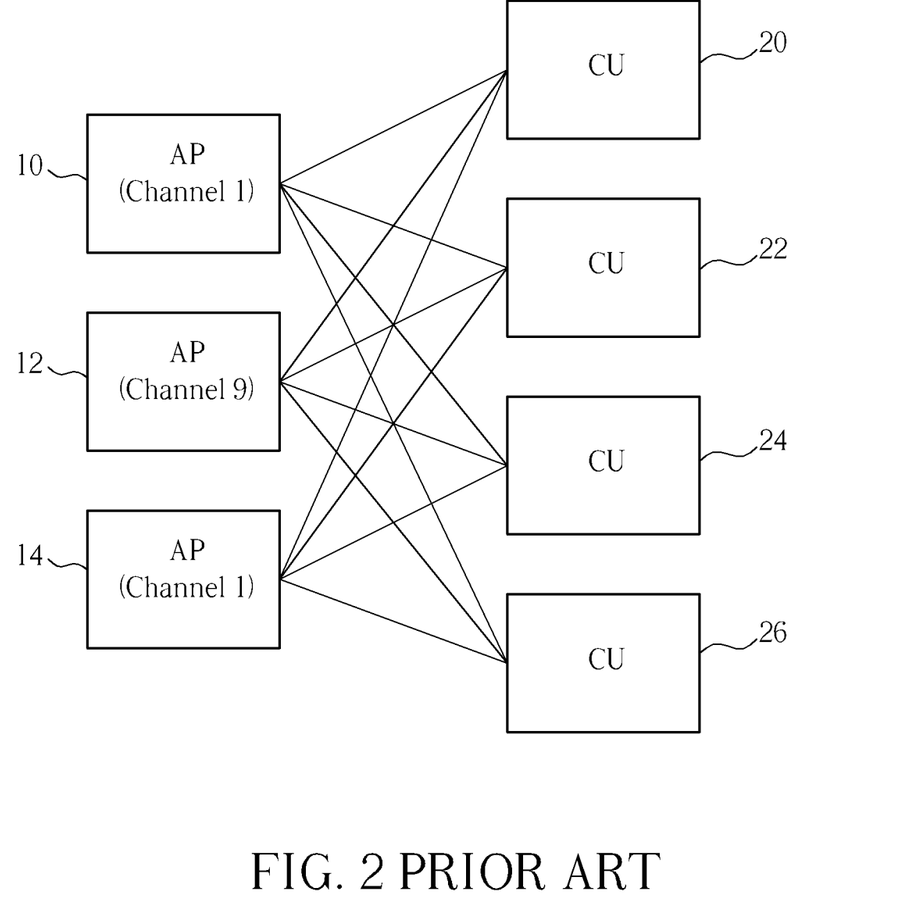
FIG. 2 illustrates an operating environment in which communication units attempt to wirelessly communicate with access points.

Please refer to FIG. 2. FIG. 2 illustrates an operating environment in which communication units (CU) 20, 22, 24, 26 attempt to wirelessly communicate with access points (AP) 10, 12, 14. Each access point 10, 12, 14 is deployed on a specific channel, such as channel 1 or 9. To communicate with each other, communication units 20, 22, 24, 26 should first join a basic service set (BSS) or an extended service set (ESS). To associate with a BSS, communication units 20, 22, 24, 26 scan over the channels to find the candidate access point among the available access points 10, 12, 14. If the candidate access point is found in the scanning results, the communication units 20, 22, 24, 26 will issue a request to associate with the candidate access point over a wireless communication channel.

Figure 3:
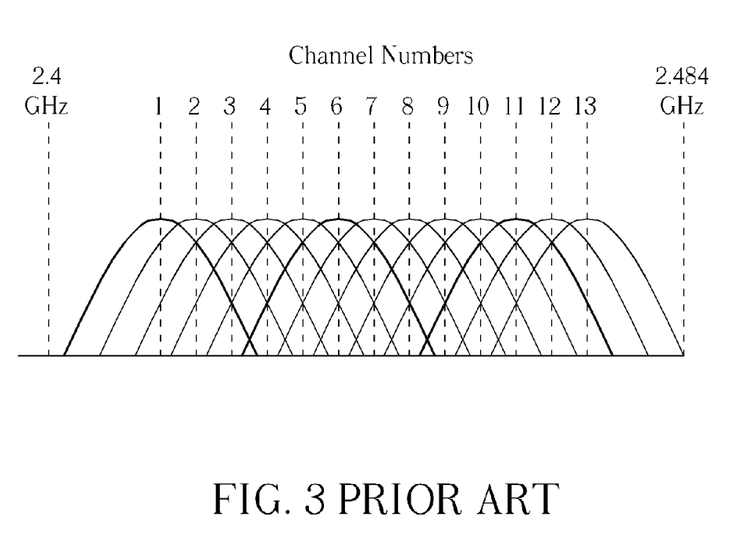
FIG. 3 shows 13 channels used in the 2.4 GHz band, and illustrates the overlapping nature of the channels.

Please refer to FIG. 3. FIG. 3 shows 13 channels used in the 2.4 GHz band, and illustrates the overlapping nature of the channels. As shown in FIG. 3, channels that are close to each other, such as channels 5 and 6, overlap to a large degree. Channels that are farther apart from one another, such as channels 1 and 6, do not overlap to any meaningful extent. Overlapping channels can cause interference with one another, and as a result, many device manufacturers, such as access point manufacturers, prefer to configure their devices so that non-overlapping channels are used for signal transmission and reception in order to minimize conflicts and interference between the channels. Based on the defined channel scheme of 802.11b/g for the North American domain within the 2.4 GHz band, up to three non-overlapping channels can be used. FIG. 3 illustrate that channels 1, 6, and 11 are the typical three non-overlapping channels used, and these channels are emphasized in bold in FIG. 3. Each of the channels in this group of non-overlapping channels operates at a frequency that is spaced far enough apart from frequencies of the other channels in the group that the channels do not interfere with one another. Other groups of non-overlapping channels can be created, such as channels 2, 7, and 12 or channels 3, 8, and 13, but at most only three non-overlapping channels can be used in a single group according to the specification illustrated in FIG. 3 without any modifications.

Although different non-overlapping channel group combinations are possible, many access points and other wireless devices sold use channels 1, 6, and 11. As a result, channels 1, 6, and 11 are often the busiest channels in use. When a wireless communication unit wishes to scan each channel in a wireless band to completely discover available access points, a full scan must be performed. Unfortunately, some access points may not be discovered during the full scan if each channel is scanned for the same period of time. As some channels are more congested than others, access points using the congested channels of the wireless band may not be discovered during the full scan process. If a known access point is not included in the full scan results, another full scan should be started, thereby wasting considerable time and network resources. As a result, a better scanning method is needed to address these problems.

SUMMARY OF THE INVENTION

It is therefore one of the primary objectives of the claimed invention to provide methods of optimizing network scanning procedures for more efficiently discovering access points on channels of a wireless band.

According to an exemplary embodiment of the claimed invention, a method of optimizing scanning parameters for a plurality of channels in a wireless band is disclosed. The method includes identifying channels in the plurality of channels as overlapping channels and identifying channels in the plurality of channels as non-overlapping channels, wherein each of the non-overlapping channels transmits and receives signals at frequencies that do not overlap frequencies of other non-overlapping channels. Then scanning parameters for each channel are optimized in order to assign the scanning parameters to be normal scanning parameters or extended scanning parameters, the extended scanning parameters indicating longer scanning times used for scanning channels than that of the normal scanning parameters. Next each overlapping channel is scanned with a networked electronic device using the normal scanning parameters. The method also includes scanning each non-overlapping channel with the networked electronic device using the extended scanning parameters.

According to another exemplary embodiment of the claimed invention, a method of optimizing scanning parameters for a plurality of channels in a wireless band is disclosed. The method includes identifying channels in the plurality of channels as belonging to a first channel group, identifying channels in the plurality of channels as belonging to a second channel group, optimizing scanning parameters for each channel in order to assign the scanning parameters to be first scanning parameters or second scanning parameters, the second scanning parameters indicating longer scanning times used for scanning channels than that of the first scanning parameters, scanning each channel in the first group with a networked electronic device using the first scanning parameters, and scanning each channel in the second group with the networked electronic device using the second scanning parameters.

According to another exemplary embodiment of the claimed invention, a method of optimizing scanning parameters for a plurality of channels in a wireless band is disclosed. The method includes scanning each channel in the plurality of channels with a networked electronic device using scanning parameters assigned to each channel, the scanning parameters being stored within the networked electronic device and indicating an amount of time used for scanning the respective channels. The method also includes performing the following steps for each channel of the plurality of channels: counting access points that are transmitting and receiving signals on the channel as the channel is scanned to produce an access point total for the channel, comparing the access point total for the channel to a first threshold and a second threshold, the second threshold being higher than the first threshold, and updating the scanning parameters assigned to the channel according to the comparison with the first threshold and the second threshold, and storing the updated scanning parameters in the networked electronic device.

According to yet another exemplary embodiment of the claimed invention, a method of optimizing scanning parameters for a plurality of channels in a wireless band is disclosed. The method includes scanning each channel in the plurality of channels with a networked electronic device using scanning parameters assigned to each channel, the scanning parameters being stored within the networked electronic device and indicating an amount of time used for scanning the respective channels. For each channel of the plurality of channels, access points that are transmitting and receiving signals on the channel are counted as the channel is scanned to produce an access point total for the channel. Next a plurality of channel groups are created such that each channel within each channel group transmits and receives signals at frequencies that do not overlap frequencies of other channels within the same channel group. Then, for each channel group, the access point totals for each channel in the channel group are added to create a channel group total. These channel group totals are compared for the plurality of channel groups, and a channel group having the highest channel group total is selected. Next, for each channel, the scanning parameters assigned to the channel are updated and stored in the networked electronic device, wherein the scanning parameters assigned to channels in the selected channel group are extended scanning parameters, and the scanning parameters assigned to channels other than the channels in the selected channel group are normal scanning parameters, the extended scanning parameters indicating longer scanning times used for scanning channels than that of the normal scanning parameters.

It is an advantage that the present invention takes into account the amount of congestion on each channel of the wireless band in order to more efficiently scan each channel of the wireless band as thoroughly and efficiently as possible.

These and other objectives of the present invention will no doubt become obvious to those of ordinary skill in the art after reading the following detailed description of the preferred embodiment that is illustrated in the various figures and drawings.

DETAILED DESCRIPTION

The present invention recognizes that due to the differing congestion levels on each channel of a wireless band, performing a full scan for discovering available access points on all of the channels needs to take the various channel congestion levels into account. By considering congestion levels, scan times can be reduced on less crowded channels while devoting more time to discovering a maximum amount of access points on more congested channels.

Traditionally, most networked electronic devices, such as the communication units 20, 22, 24, 26, use a fixed scanning interval for each channel when wirelessly scanning for candidate access points 10, 12, 14 on the channels. Therefore, to discover candidate access points 10, 12, 14 completely, it is necessary to extend the channel scanning interval for each channel. As a result, when a full scanning is performed, the total scanning latency will be increased significantly. In contrast, if the scanning time spent on each channel is reduced equally, it is possible that access points 10, 12, 14 on some channels will be missed due to the short scanning time allotted to each channel. When this situation occurs, another full scanning should be performed if the access point that is to be associated with the communication units 20, 22, 24, 26 is not found in the results of the first scan.

Due to these problems that come from allotting equal scanning times for each channel, the total scanning times and the access point missing rate should both be optimized in order to reduce the overall scanning time while at the same time increasing the discovery rate for candidate access points. In order to achieve this goal in the present invention, channel scanning time is only increased on some channels with a high level of congestion. If the scanning time is sufficient, all or nearly all access points on these channels can be discovered. Consequently, the need to perform an additional full scanning is negligible. On the other hand, the scanning time on the less crowded channels is reduced, which helps to lower the total scanning time for all channels.

Figure 4:
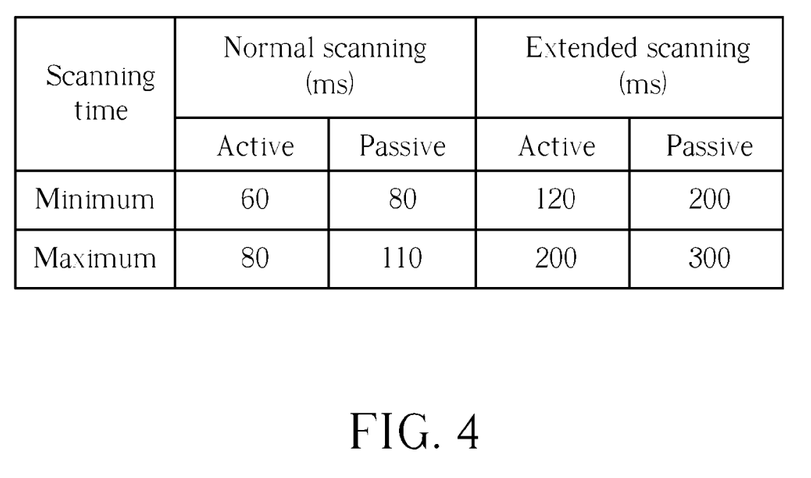
FIG. 4 shows possible scanning parameters used for scanning channels in the 2.4 GHz band for 802.11b/g according to the present invention.

Please refer to FIG. 4. FIG. 4 shows possible scanning parameters used for scanning channels in the 2.4 GHz band for 802.11b/g according to the present invention. The scanning parameters indicate minimum and maximum scanning times that should be used for active and passive scanning for two different channel groups. It will be appreciated that more than two channel groups can be used with the present invention, and the techniques involved with creating three or more different channel groups are similar to those described below for two channel groups. Moreover, for added flexibility, the number of channel groups to be used can either be decided in advance or can be dynamically decided. Channels on a band are split into two groups for optimizing the scanning parameters used on each channel: an overlapping channel group and a non-overlapping channel group. Channels identified as belonging to the overlapping channel group, or the first channel group, use normal scanning parameters when these channels are being scanned to discover access points. On the other hand, channels identified as belonging to the non-overlapping channel group, or the second channel group, use extended scanning parameters when these channels are scanned.

By way of example, if the non-overlapping channel group contains the typically used channels 1, 6, and 11, then the overlapping channel group will contain the remaining channels 2-5, 7-10, 12, and 13. Thus, the channels placed in the non-overlapping channel group and the overlapping channel group are complementary, meaning each channel is either in the non-overlapping channel group or the overlapping channel group at any one time. However, depending on changing congestion values of the various channels, these group designations for the various channels are not static, and can change according to dynamic channel congestion conditions.

One effect of having different scanning parameters for the overlapping channel group and for the non-overlapping channel group is the scanning times are optimized for each channel depending on the expected congestion values of that channel. In other words, since many access points are programmed to use channels in the non-overlapping channel group, extra scanning time is needed to fully discover the access points using those channels in the non-overlapping channel group. In contrast, as relatively fewer access points are programmed to use channels in the overlapping channel group due to fears over interference, a shorter scanning time is sufficient for fully discovering the access points using those channels in the overlapping channel group. The scanning parameters shown in FIG. 4 indicate suggested minimum and maximum scanning times for both active scanning and passive scanning, but these scanning parameters are not intended to limit the scope of the present invention. Any suitable scanning times can be used as appropriate.

Figure 5:
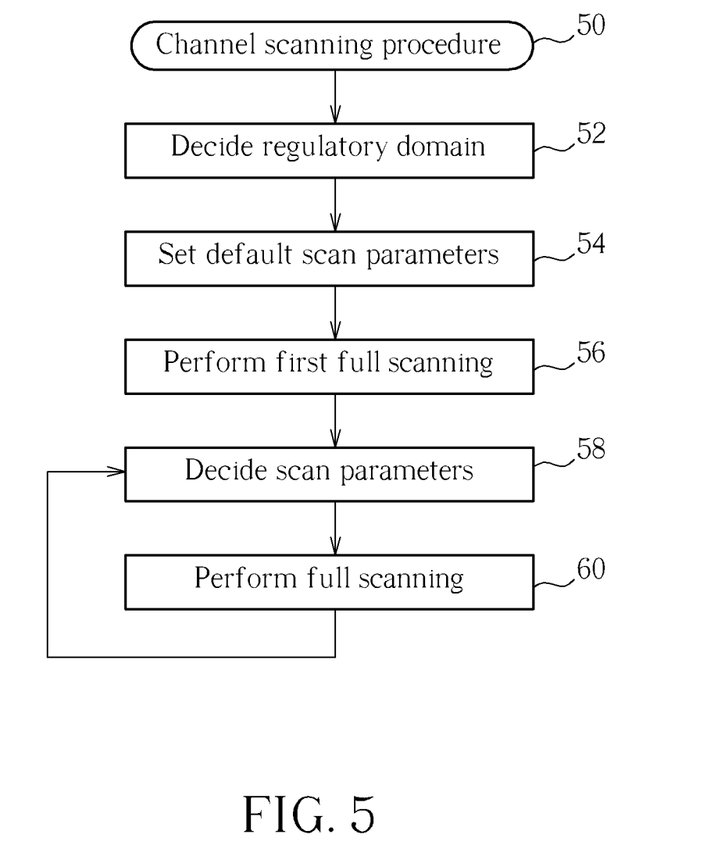
FIG. 5 is a flowchart illustrating a channel scanning procedure for adjusting channel scanning parameters according to previous scan results.

Please refer to FIG. 5. FIG. 5 is a flowchart illustrating a channel scanning procedure for adjusting channel scanning parameters according to previous scan results. Comparing to FIG. 4, which applies the same scanning parameters to all channels in the overlapping channel group or the non-overlapping channel group, FIG. 5 provides the ability to fine tune the scanning parameters for channels individually. Steps contained in the flowchart will be explained below.

Step 50: Start the channel scanning procedure.

Step 52: Determine the regulatory domain and corresponding available channels for the wireless band being scanned.

Step 54: Set default scanning parameters for the initial scan to be performed. The default scanning parameters can be programmed in a variety of ways, depending on the wishes of the wireless device manufacturer. All channels can be assigned equal default scanning times, or channels that are known to be heavily-used channels belonging to a non-overlapping channel group (such as channels 1, 6, and 11) can be assigned longer default scanning times. Default scanning times can be taken from the scanning parameters listed in FIG. 4.

Step 56: The first full scanning process is performed using the default scanning parameters set in step 54. During the full scanning process, all channels in the wireless band are scanned, and a record is made of which access points are using each channel in the wireless band. The number of access points transmitting and receiving signals on each channel is calculated, and this total number of access points is referred to as an access point total for the channel.

Step 58: Scanning parameters for each channel are updated according to the scanning results. Depending on the magnitude of the access point total for each channel, the scanning parameters for the channel are updated in order to optimize the scanning time for the channel with respect to the congestion level on that channel. The scanning parameters can be updated according to Equation 1 given below, although other formulas can be used instead.

Step 60: Perform a full scanning process using the updated scanning parameters set in step 58. During this full scanning process, a new record is made of which access points are using each channel in the wireless band, and new access point totals are calculated for each channel. After executing step 60, the channel scanning procedure returns to step 58 in order to continue optimizing the scanning parameters for each channel.

In step 58, the scanning parameters can be updated according to Equation 1. In Equation 1, the minimum scanning time and the maximum scanning time for both active scanning and passive scanning can be calculated individually by substituting the appropriate minimum and maximum scanning times shown in FIG. 4 into Equation 1 for variables $T_{normal}$ and $T_{extended}$.

$$\text{Scanning time} = \begin{cases} T_{normal}, & \text{when } N_{channel} < N_{normal} \\ T_{extended}, & \text{when } N_{channel} > N_{extended} \\ N_{channel} \times \dfrac{T_{extended} - T_{normal}}{N_{extended} - N_{normal}}, & \text{when } N_{normal} \le N_{channel} \le N_{extended} \end{cases} \quad (1)$$

where $T_{normal}$ represents the normal scanning time used for channels in the overlapping channel group, $T_{extended}$ represents the extended scanning time used for channels in the non-overlapping channel group, $N_{channel}$ represents the access point total indicating the number of access points on the channel being scanned, $N_{normal}$ represents a first threshold denoting an upper limit on the number of access points that can use a channel while the channel is still considered to be in the overlapping channel group, and $N_{extended}$ represents a second threshold, higher than the first threshold $N_{normal}$, denoting a lower limit on the number of access points that can use a channel while the channel is still considered to be in the non-overlapping channel group.

As shown in Equation 1, the scanning time assigned to a channel is mainly dependent on the value of $N_{channel}$, which represents the access point total for the channel. When there are few access points on a channel, the assigned scanning times are the normal scanning times that are used for less crowded channels such as channels in the overlapping channel group. When there are many access points on a channel, the assigned scanning times are the extended scanning times that are used for more crowded channels such as channels in the non-overlapping channel group. Finally, when there is neither a high number nor a low number of access points on a channel, and the value of $N_{channel}$ is between the threshold values of $N_{normal}$ and $N_{extended}$, a prorated value of the scanning time is calculated in order to choose a scanning time that is directly proportional to the value of $N_{channel}$.

Figure 6:
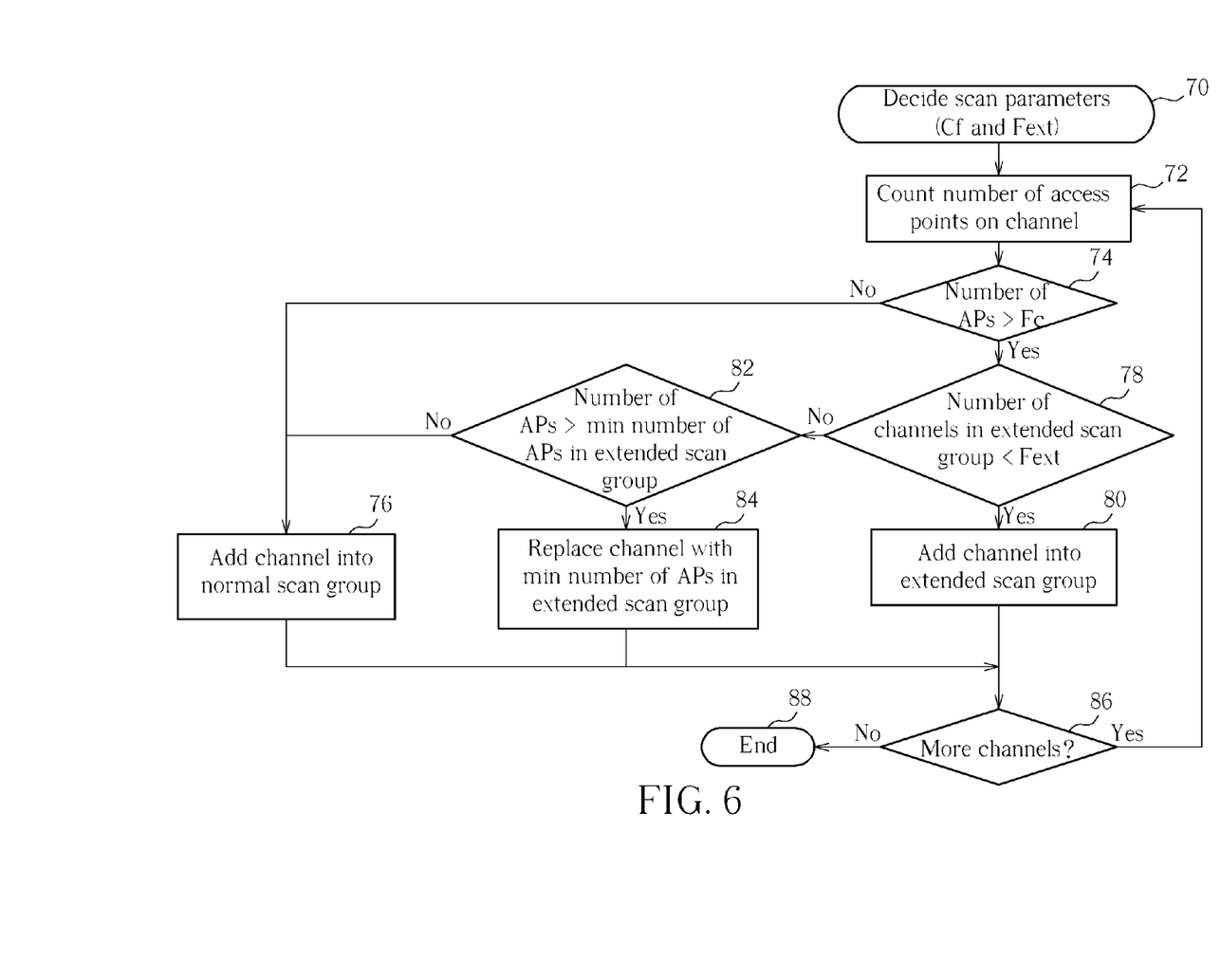
FIG. 6 is a flowchart illustrating another procedure for adjusting channel scanning parameters according to the present invention.

Please refer to FIG. 6. FIG. 6 is a flowchart illustrating another procedure for adjusting channel scanning parameters according to the present invention. Comparing to the flowchart of FIG. 5, the flowchart in FIG. 6 considers not only the access point total for each channel, but also how many channels have already been classified as being in an extended scan group, as opposed to those channels being in a normal scan group. The extended scan group and the normal scan group are analogous to the non-overlapping channel group (second scan group) and the overlapping channel group (first scan group) mentioned above, respectively. The flowchart in FIG. 6 helps to classify channels as being in the normal scan group or the extended scan group. Steps contained in the flowchart will be explained below.

Step 70: Decide the scanning parameters to be used, including a congestion factor Fc and an extended channel factor Fext. The congestion factor Fc is a limit of how many access points can use a channel before the channel is regarded as being overly congested. The extended channel factor Fext is a limit of how many channels can be in the extended scan group at once, and a numerical example of the extended channel factor Fext is three channels. Having three channels in an extended channel group is consistent with the earlier example of channels 1, 6, and 11 being in the non-overlapping group. However, the extended channel factor Fext is not limited to being three. In the following, steps 72-84 are executed for one channel at a time, with additional channels being addressed separately.

Step 72: The number of access points using the channel is counted in order to calculate an access point total.

Step 74: The access point total is compared to the congestion factor Fc. When the access point total is greater than the congestion factor Fc, step 78 is executed. Otherwise, step 76 is executed.

Step 76: The channel is added to the normal scan group, and normal scanning parameters will be used when the channel is scanned. The channel is now identified as belonging to the normal scan group. Step 86 is then executed.

Step 78: The number of channels already included in the extended scan group is compared to the extended channel factor Fext. When the number of channels already in the extended scan group is less than the extended channel factor Fext, step 80 is executed. Otherwise, step 82 is followed.

Step 80: The channel is added to the extended scan group since the access point total for the channel is higher than the congestion factor Fc and there is still room for the channel in the extended scan group. The channel is now identified as belonging to the extended scan group. Step 86 is then executed.

Step 82: All channels in the extended scan group are compared, and the minimum access point total for the channels in the extended scan group is selected. Next, the access point total for the current channel being considered is compared to the minimum access point total for the channels in the extended scan group. If the access point total for the current channel being considered is greater than the minimum access point total for the channels in the extended scan group, step 84 is executed. Otherwise, step 76 is executed.

Step 84: The current channel being considered replaces the channel in the extended scan group having the minimum access point total. In this way, the extended scan group is composed of the channels that have the highest access point totals of all channels in the wireless band.

Step 86: Determine if another channel requires analysis. If so, step 72 is executed. If not, step 88 is executed.

Step 88: The procedure for adjusting channel scanning parameters ends. After channels have been classified as being in the normal scan group or the extended scan group, their scanning parameters can be adjusted accordingly.

Figure 7:
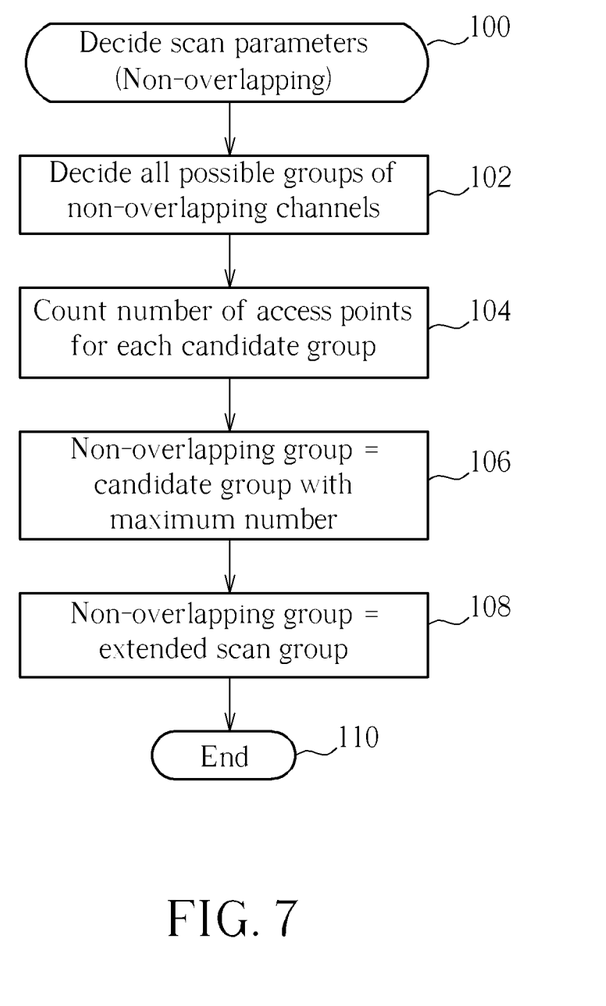
FIG. 7 is a flowchart illustrating yet another procedure for adjusting channel scanning parameters according to the present invention.

Please refer to FIG. 7. FIG. 7 is a flowchart illustrating yet another procedure for adjusting channel scanning parameters according to the present invention. Comparing to the flowchart of FIG. 6, the flowchart in FIG. 7 does not classify individual channels into the normal scan group or the extended scan group in a channel-by-channel manner. Instead, candidate groups of channels are compared with one another to determine which candidate group has the most access points using the channels in that group. For example consider channels 1, 6, and 11 as being part of a first candidate group, channels 2, 7, and 12 as being part of a second candidate group, and channels 3, 8, and 13 as being part of a third candidate group. The access point totals for all channels in the first candidate group are compared to that of the second and third candidate groups to determine which candidate group should be designated as the non-overlapping group. In this case, the designated non-overlapping group is also referred to as the extended scan group since the extended scanning parameters are applied to each channel in the non-overlapping group. Steps contained in the flowchart will be explained below.

Step 100: Decide the scanning parameters to be used. In this case, the flowchart will consider groups of non-overlapping channels only.

Step 102: All possible groups of non-overlapping channels are decided. As explained above, first, second, and third candidate groups can be considered for comparison with one another. Other groups of channels besides the first through third groups mentioned above can also be considered, so long as the channels within each group do not overlap with one another.

Step 104: Count the access point totals for all channels within each candidate group to create a channel group total for each candidate group. Next the channel group totals for all candidate groups are compared with each other.

Step 106: The candidate group having the maximum channel group total is selected as the non-overlapping group.

Step 108: The selected non-overlapping group is regarded as the extended scan group. All channels within the extended scan group are identified as belonging to the extended scan group, and the scanning parameters for all channels in the extended scan group are adjusted accordingly to use extended scanning parameters. Other channels not belonging to the extended scan group are identified as belonging to the normal scan group and use the normal scanning parameters.

Step 110: End.

In summary, any networked electronic device using wireless communication to connect with an access point may use the above methods for updating scan parameters according to the number of access points using the channels in a wireless band. For example, a notebook computer, a smart television having internet capability, a wireless networked receiver, or other such devices that can communicate on a WLAN are all prime candidates for utilizing the above-mentioned methods for optimizing channel scanning.

Those skilled in the art will readily observe that numerous modifications and alterations of the device and method may be made while retaining the teachings of the invention.

What is claimed is:

1. A method of optimizing scanning parameters for a plurality of channels in a wireless band, the method comprising:
    identifying channels in the plurality of channels as overlapping channels;
    identifying channels in the plurality of channels as non-overlapping channels, wherein each of the non-overlapping channels transmits and receives signals at frequencies that do not overlap frequencies of other non-overlapping channels;
    optimizing scanning parameters for each channel in order to assign the scanning parameters to be normal scanning parameters or extended scanning parameters, the extended scanning parameters indicating longer scanning times used for scanning channels than that of the normal scanning parameters;
    scanning each overlapping channel with a networked electronic device using the normal scanning parameters; and
    scanning each non-overlapping channel with the networked electronic device using the extended scanning parameters.

2. The method of claim 1, wherein the normal scanning parameters and the extended scanning parameters are stored within the networked electronic device, and the method further comprises:
    for each channel of the plurality of channels:
        counting access points that are transmitting and receiving signals on the channel as the channel is scanned to produce an access point total for the channel;
        comparing the access point total for the channel to a first threshold and a second threshold, the second threshold being higher than the first threshold; and
        updating the scanning parameters assigned to the channel according to the comparison of the access point total with the first threshold and the second threshold, and
        storing the updated scanning parameters in the networked electronic device.

3. The method of claim 2, wherein updating the scanning parameters assigned to each channel comprises:
    updating scanning parameters assigned to the channel to be the normal scanning parameters when the access point total is less than the first threshold; and
    updating scanning parameters assigned to the channel to be the extended scanning parameters when the access point total is greater than the second threshold.

4. The method of claim 2, further comprising rescanning each channel of the plurality of channels using the updated scanning parameters.

5. The method of claim 1, wherein the wireless band is the 2.4 GHz band according to the IEEE 802.11 standard, and the non-overlapping channels comprise at least one of channel 1, channel 6, and channel 11.

6. A method of optimizing scanning parameters for a plurality of channels in a wireless band, the method comprising:
    identifying channels in the plurality of channels as belonging to a first channel group;
    identifying channels in the plurality of channels as belonging to a second channel group;
    optimizing scanning parameters for each channel in order to assign the scanning parameters to be first scanning parameters or second scanning parameters, the second scanning parameters indicating longer scanning times used for scanning channels than that of the first scanning parameters;
    scanning each channel in the first group with a networked electronic device using the first scanning parameters; and
    scanning each channel in the second group with the networked electronic device using the second scanning parameters.

7. The method of claim 6, wherein the first scanning parameters and the second scanning parameters are stored within the networked electronic device, and the method further comprises:
    for each channel of the plurality of channels:
        counting access points that are transmitting and receiving signals on the channel as the channel is scanned to produce an access point total for the channel;
        comparing the access point total for the channel to a first threshold and a second threshold, the second threshold being higher than the first threshold; and updating the scanning parameters assigned to the channel according to the comparison of the access point total with the first threshold and the second threshold, and storing the updated scanning parameters in the networked electronic device.

8. The method of claim 7, wherein updating the scanning parameters assigned to each channel comprises:

updating scanning parameters assigned to the channel to be the first scanning parameters when the access point total is less than the first threshold; and updating scanning parameters assigned to the channel to be the second scanning parameters when the access point total is greater than the second threshold.

9. The method of claim 7, further comprising rescanning each channel of the plurality of channels using the updated scanning parameters.

10. The method of claim 6, wherein the wireless band is the 2.4 GHz band according to the IEEE 802.11 standard, and the non-overlapping channels comprise at least one of channel 1, channel 6, and channel 11.

11. The method of claim 6, further comprising:

for each channel of the plurality of channels:

counting access points that are transmitting and receiving signals on the channel as the channel is scanned to produce an access point total for the channel;

comparing the access point total for the channel to a congestion factor;

identifying the channel as belonging to the first channel group when the access point total is less than or equal to the congestion factor; and identifying the channel as belonging to the second channel group when the access point total is greater than the congestion factor and when a number of channels in the second channel group is less than a second channel group limit.

12. The method of claim 11, wherein when the number of channels in the second channel group is greater than or equal to the second channel group limit and the channel has an access point total greater than the congestion factor, the method further comprises replacing another channel already belonging to the second channel group with the channel when the channel has a higher access point total than the other channel being replaced.

13. A method of optimizing scanning parameters for a plurality of channels in a wireless band, the method comprising:

scanning each channel in the plurality of channels with a networked electronic device using scanning parameters assigned to each channel, the scanning parameters being stored within the networked electronic device and indicating an amount of time used for scanning the respective channels; and for each channel of the plurality of channels:

counting access points that are transmitting and receiving signals on the channel as the channel is scanned to produce an access point total for the channel;

comparing the access point total for the channel to a first threshold and a second threshold, the second threshold being higher than the first threshold; and updating the scanning parameters assigned to the channel according to the comparison with the first threshold and the second threshold, and storing the updated scanning parameters in the networked electronic device.

14. The method of claim 13, wherein updating the scanning parameters assigned to each channel comprises:

updating scanning parameters assigned to the channel to be first scanning parameters when the access point total is less than the first threshold; and updating scanning parameters assigned to the channel to be second scanning parameters when the access point total is greater than the second threshold.

15. The method of claim 13, further comprising rescanning each channel of the plurality of channels using the updated scanning parameters.

16. The method of claim 13, wherein the wireless band is the 2.4 GHz band according to the IEEE 802.11 standard.

17. The method of claim 16, wherein the scanning parameters assigned to each channel are initially configured such that channel 1, channel 6, and channel 11 use extended scanning parameters and all other channels use normal scanning parameters, the extended scanning parameters indicating longer scanning times used for scanning channels than that of the normal scanning parameters.

18. A method of optimizing scanning parameters for a plurality of channels in a wireless band, the method comprising:

scanning each channel in the plurality of channels with a networked electronic device using scanning parameters assigned to each channel, the scanning parameters being stored within the networked electronic device and indicating an amount of time used for scanning the respective channels;

for each channel of the plurality of channels, counting access points that are transmitting and receiving signals on the channel as the channel is scanned to produce an access point total for the channel;

creating a plurality of channel groups such that each channel within each channel group transmits and receives signals at frequencies that do not overlap frequencies of other channels within the same channel group;

for each channel group, adding the access point totals for each channel in the channel group to create a channel group total;

comparing channel group totals for the plurality of channel groups, and selecting a channel group having the highest channel group total; and for each channel, updating the scanning parameters assigned to the channel and storing the updated scanning parameters in the networked electronic device, wherein the scanning parameters assigned to channels in the selected channel group are extended scanning parameters, and the scanning parameters assigned to channels other than the channels in the selected channel group are normal scanning parameters, the extended scanning parameters indicating longer scanning times used for scanning channels than that of the normal scanning parameters.

19. The method of claim 18, further comprising rescanning each channel of the plurality of channels using the updated scanning parameters.

* * * * *